May 18, 1926.
A. SCHROEDER
UNIVERSAL DRIVING GEAR
Filed Nov. 19, 1923
1,585,119
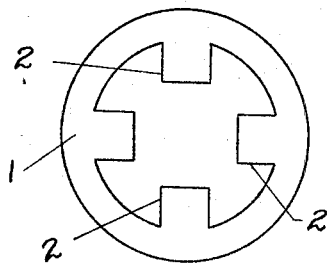
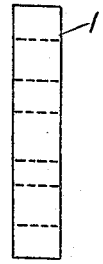
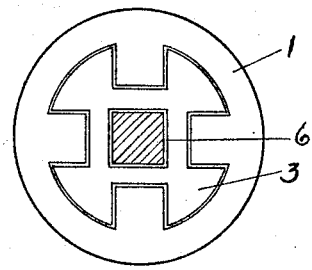
Fig. 2.   Fig. 3.   Fig. 1.
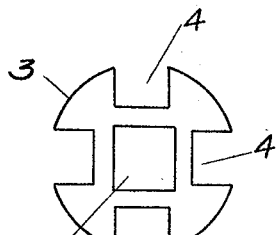
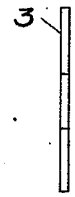
Fig. 4.   Fig. 5.
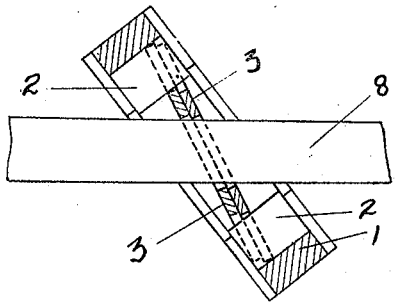
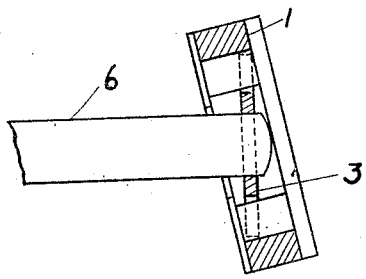
Fig. 7.   Fig. 6.
WITNESS:
William B. Hornell.
INVENTOR,
Albert Schroeder,
BY
ATTORNEY.

Patented May 18, 1926.

1,585,119

UNITED STATES PATENT OFFICE.

ALBERT SCHROEDER, OF PIQUA, OHIO.

UNIVERSAL DRIVING GEAR.

Application filed November 19, 1923. Serial No. 675,460.

This invention relates to new and useful improvements in universal driving gears, and relates particularly to an angular driving connection between two or more moving parts.

It is the principal object of my invention to provide between two or more moving parts, an angular driving connection which is simpler than a universal joint and which requires less power for its operation. The device is strong and flexible, and does not take up much space.

Other important and incidental objects will be brought out in the following specification, and particularly set forth in the subjoined claim.

In the accompanying drawings, Figure 1 is a side elevational view, partly in section, showing the toothed member and connecting plate of my driving connection applied to a shaft. Figure 2 is a side elevational view of the toothed member itself. Figure 3 is an end view thereof. Figure 4 is a side elevational view of the plate which fits within the toothed member to receive the driving or driven part. Figure 5 is an end view of the same. Figure 6 is a side elevational view, partly in section, of my improved universal driving means applied to a hub, and showing a single connecting plate fitted tightly on the latter. And Figure 7 is a side elevational view, partly in section, of two of my toothed members applied to a shaft.

Throughout the specification and drawings, similar reference characters denote corresponding parts.

Referring to the accompanying drawings for a detailed description of my invention, the numeral 1 designates an annular member which may be formed as a casting or in any other manner to provide on its inner periphery a series of radial teeth 2. These teeth are preferably spaced an equal distance apart, and while I have shown four of them in Figure 2, any other number may be provided if desired.

Referring to Figure 4, the numeral 3 designates a circular plate which may be stamped or otherwise formed from metal or other suitable material, to provide in its outer edge a series of radial notches 4 that are equal in number to the teeth 2 within the annular member 1, and so spaced as to loosely fit those teeth. This plate contains a central hole 5 that has one or more straight sides to fit a shaft or hub of like contour in cross section. I prefer to make the hole square, however, to fit a shaft or hub which, in cross section, is also square.

The plate 3 has sufficient freedom of movement within the annular member 1, to readily accommodate itself to the different angular positions that the part which it receives, assumes. If the annular member 1 is secured within a driving pulley, gear or other rotating part, it is possible through the connecting plate 3 to drive a shaft or hub at an angle to the gear, with less power and with greater facility than would be possible by the use of a universal joint. Furthermore, since the plate 3 is contained within the annular member, the space which my improved driving connection occupies is no more than that required for a rigid connection between a gear and shaft.

In those cases where the shaft or hub bears a small angular relation to the driving or driven member, a single thick plate 3 may be rigidly secured to said hub or shaft, or it may be made integral therewith. In Figure 6 I have shown a single, relatively thick plate 3 tightly secured on a hub 6 to cause it to be rotated by the toothed member 1 at a slight angle to the latter.

In those cases where the driving or driven part is at a wide angle to the toothed member 1, as in Figure 7, the plate 3 is provided with a central hole 5 that is larger than the thickness of the part. There is thus permitted to the driving or driven part, a certain angular movement within the plate, which, together with the freedom of movement in all directions which the plate itself has on the teeth 2 of the annular member 1, will enable the latter to drive, or to be driven by, a shaft or hub at a wide angle to it.

To insure a firm connection between the toothed member and the hub or shaft, without lessening the angular relation between them, two or more relatively thin plates 3, with central holes 5 larger than the cross sectional area of the hub or shaft, may be employed as in Figure 7. These plates will be free to move along the teeth 2 to easily accommodate themselves to the different positions which they must assume to drive the hub or shaft at the required angle to the toothed member.

In Figure 7 I have shown a shaft 8 which drives two toothed members 1, within each one of which there are two thin plates 3. The latter, which are free to move with respect to the teeth 2 of their toothed members, contain large central holes through which the shaft 8 passes, so that it may have a certain freedom of movement with respect to them. It is thus possible for the shaft to rotate the two toothed members which are disposed at a wide angle to it, for the purpose of driving any members such as gears or pulleys of which said toothed members may be a part.

It will thus be seen that my improved universal connection makes it possible to drive two or more gears, pulleys or other parts from a single shaft when they are at an angle to the latter. The plates 3 being free to accommodate themselves to different positions within the annular members 1, 1, will drive the latter through their engagement with them. In the present instance, this engagement is effected between the teeth 2 of said members and the notches 4 within the plates, although any other form of engaging means may be provided in the annular members and plates if desired.

I do not wish to be limited to the details of construction and arrangement herein shown and described, and any changes or modifications may be made therein within the scope of the subjoined claim.

Having described my invention, I claim:

A universal driving connection of the type described, comprising an annular member formed in its inner periphery with engaging portions, a plate within said member formed to move angularly with respect to said engaging portions, said plate containing a central hole with one or more straight sides, and an axial element conforming in cross sectional area to said hole, but of substantially less size than the latter, for the purpose of entering it for rotation by the annular member at a wide angle to it.

In testimony whereof I have hereunto set my hand this 17th day of November, 1923.

ALBERT SCHROEDER.